3 Sheets—Sheet 1.
J. P. H. GASTRELL.
MECHANICAL MOVEMENT.
No. 11,129. Reissued Dec. 2, 1890.
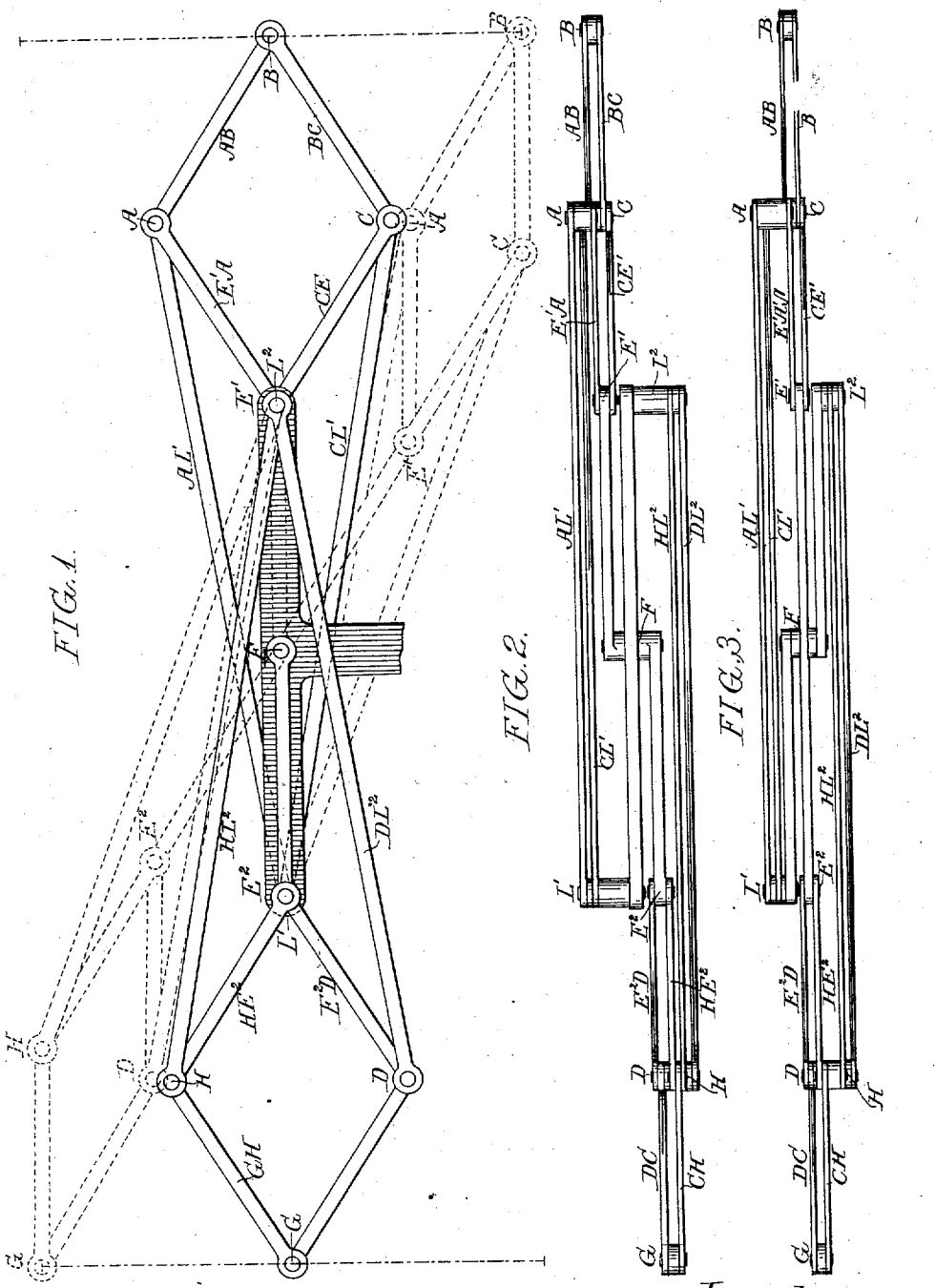
Witnesses:
Hamilton D. Turner
Alex. Barkoff
Inventor:
James P. H. Gastrell
by his Attorneys
Howson & Howson
THE NORRIS PETERS CO., PHOTO-LITHO., WASHINGTON, D. C.

J. P. H. GASTRELL.

MECHANICAL MOVEMENT.

No. 11,129. Reissued Dec. 2, 1890.

Witnesses:
Hamilton D. Turner.
Alex. Parkoff

Inventor:
James P. H. Gastrell
by his Attorneys
Howson & Howson

THE NORRIS PETERS CO., PHOTO-LITHO., WASHINGTON, D. C.

J. P. H. GASTRELL.

MECHANICAL MOVEMENT.

No. 11,129. Reissued Dec. 2, 1890.

Witnesses:
Hamilton D. Turner.
Alex. Barkoff

Inventor:
James P. H. Gastrell
by his Attorneys
Howson & Howson

THE NORRIS PETERS CO., PHOTO-LITHO., WASHINGTON, D. C.

UNITED STATES PATENT OFFICE.

JAMES P. H. GASTRELL, OF WIESBADEN, GERMANY.

MECHANICAL MOVEMENT.

SPECIFICATION forming part of Reissued Letters Patent No. 11,129, dated December 2, 1890.

Original No. 428,476, dated May 20, 1890. Application for reissue filed October 20, 1890. Serial No. 368,719.

*To all whom it may concern:*

Be it known that I, JAMES P. H. GASTRELL, a subject of the Queen of Great Britain and Ireland, and a resident of Wiesbaden, Nassau, Germany, and domiciled within the territory of the said Nassau, have invented certain Improvements in Mechanical Movements, of which the following is a specification.

The object of my invention is to construct an improved mechanical device in which the extremities of a lever or arm swinging on a center will describe a straight line and not a curve.

My invention is especially applicable to scale-beams, pumps, cranes, piano-key mechanism, treadles, and other devices in which a straight-line action of pull is desirable or essential.

Figure 4:
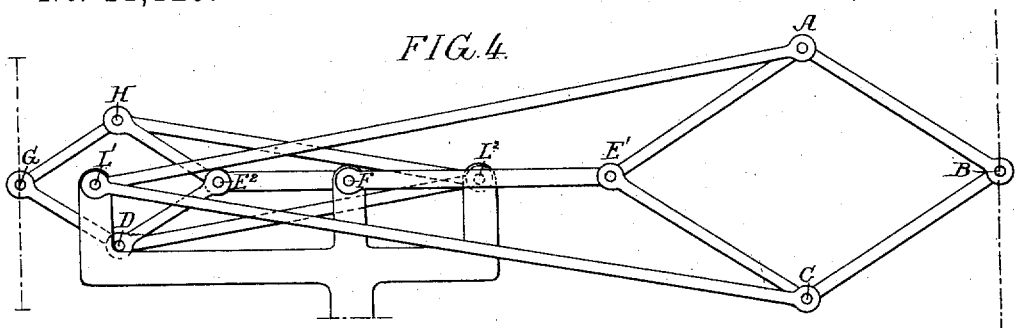
Figure 5:
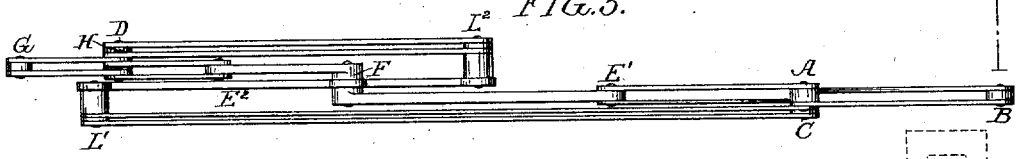
Figure 6:
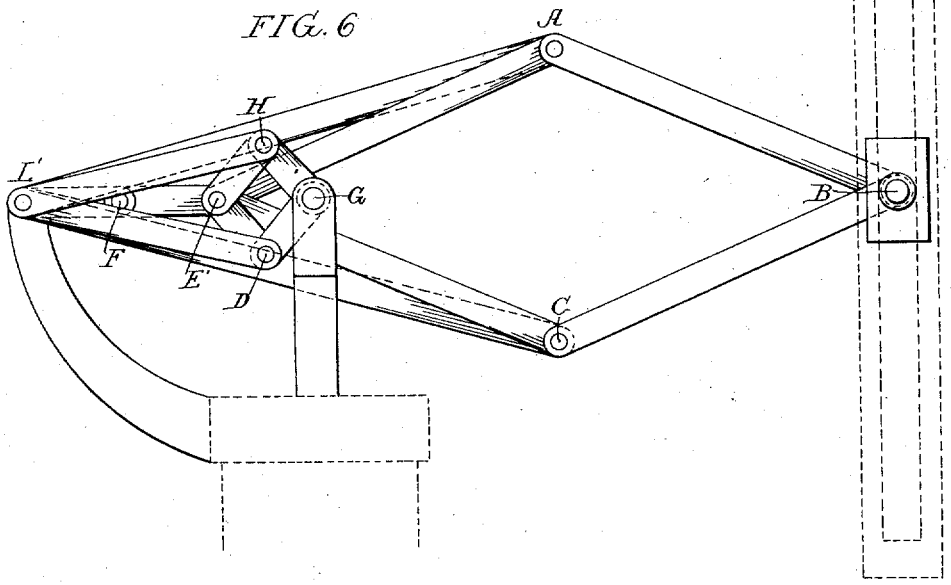
Figure 7:
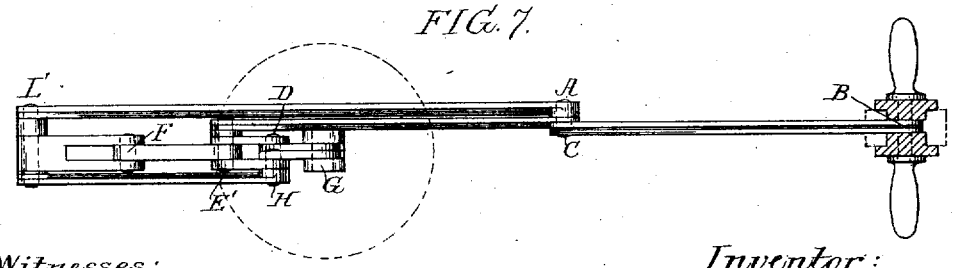
Figure 10:
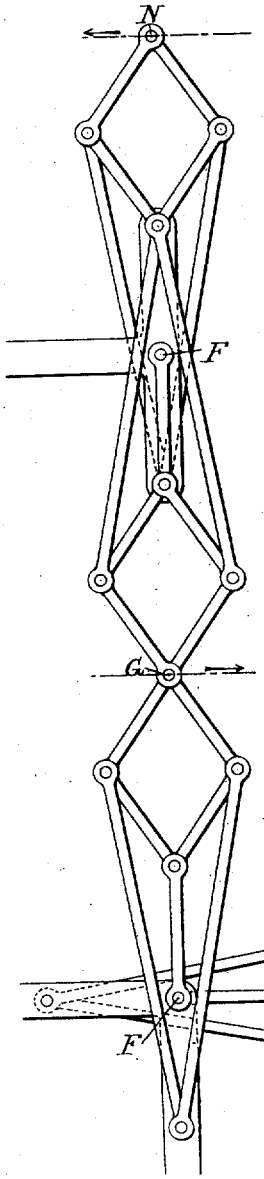
Figure 8:
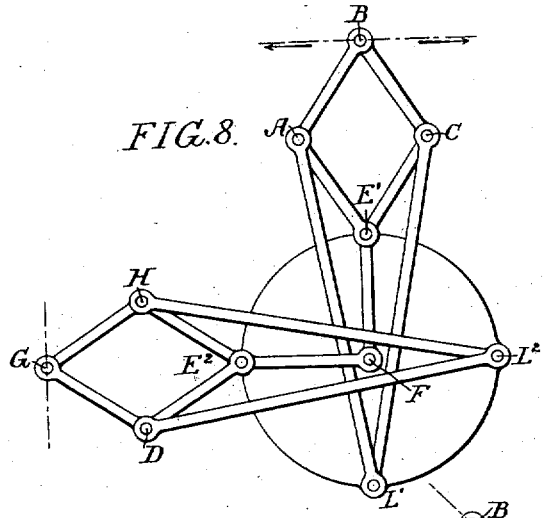
Figure 9:
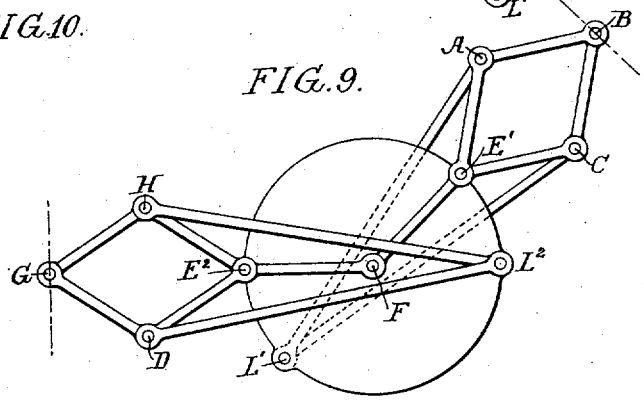
Figure 11:
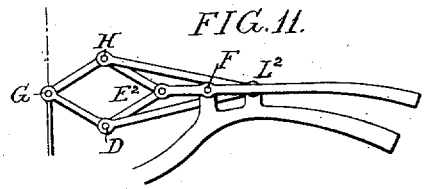

In the accompanying drawings, Figure 1 is a side view showing my invention as applied to scale-beams or other walking-beams. Fig. 2 is a plan view of Fig. 1. Fig. 3 is a plan view of a modification of Fig. 2. Fig. 4 is a modified form of Fig. 1. Fig. 5 is a plan of Fig. 4. Fig. 6 is another modification showing the application of the movement to a pump. Fig. 7 is a plan view of Fig. 6. Fig. 8 is a side view showing the application of my improved movement, by which two movements are produced in a straight line, one at right angles to the other. Fig. 9 is a modified form of the device shown in Fig. 8, the angles in this case being changed. Fig. 10 is a side view showing the mechanism so constructed that two horizontal movements in opposite directions are produced by a single vertical movement; and Fig. 11 is a view of a single set of links on one arm of a lever.

Referring to Figs. 1 and 2 in the first instance, I have shown a lever having two equal arms, pivoted at F to a base of any suitable construction. These two arms terminate, respectively, at E′ and $E^2$. L′ and $L^2$ are the pivots on the base, to which are connected the long links described hereinafter. Pivoted to the arms of the lever at E′ are two links E′, A, and CE′. These links are pivoted at A and C, respectively, to links AB and BC, which are pivoted together at the point B. A long link AL′ is pivoted at L′ to the base and to the links above described at A, and a long link CL′ is pivoted at L′ and to the links at C. This series of links forms one-half of the lever, and if the point B were moved it would describe a straight line, as shown by dotted lines in Fig. 1. The opposite arm of the lever is pivoted at $E^2$ to the links $HE^2$ and $E^2D$, which in turn are pivoted to the links GH and DG at the points H and D. The latter links are pivoted together at the point G. The long link $HL^2$ is pivoted to the links above described at H and to the base at $L^2$, while the long link $DL^2$ is connected to the base at $L^2$ and to the links at D. These two sets of links being pivoted, respectively, at L′ and $L^2$ to the base and pivoted to a lever having its center or fulcrum at F, as soon as one set of the links moves the opposite set will move in the reverse direction, but the point G will travel in a parallel line with the point B described.

In Fig. 3 the arms of the lever are in line, and the base-section is of a form to accommodate this alignment. In some instances only one set of links may be used—as, for instance, when it is desirable to have the device operated upon move in a straight line; but it is immaterial whether or not the operating lever move in a circular path—such, for instance, as shown in Fig. 11. The mechanism is especially applicable for use in balances and scales, pumps, key-lever mechanism for typewriting machines, walking-beams of engines, valve-gear, treadles, gates, corkscrews, or nail-removers, and many other devices in which it is advantageous to have a straight-line movement or movements in which a lever must necessarily form one of the leading elements.

In Figs. 4 and 5 I have represented the arms of the lever of different lengths, in the present instance two to one, the same idea being carried out in these figures as in Fig. 1, with the exception that one arm of the lever is only one-half the length of the other arm, and the links appertaining thereto are reduced in proportion.

In Figs. 6 and 7 I have shown my invention applied to a hand-pump, in which the handle is reciprocated in a straight line, and the pump-rod consequently moved in a straight line, the two arms of the lever in this instance being side by side, and the quadrangular link-works are placed practically side by side and the links composing the cells are of different length, forming a lever of the second class. The two arms of the lever may be amalgamated where circumstances permit without departing from my invention.

In Fig. 8 I have shown my invention as applied to bell-crank mechanism, in which a vertical straight movement is transformed into a horizontal straight movement, as indicated by the arrow, the arms of the lever having its fulcrum at F being at right angles to each other.

In Fig. 9 the same idea is carried out as in Fig. 8, with the difference that the arms of the lever are at a different angle.

In Fig. 10 the devices shown in Figs. 1 and 8 are combined, so that by moving the point B downward, as indicated by the arrow, the point G will be moved in a direction indicated by its arrow and the point N will be moved in a direction indicated by its arrow reverse to that of the point G. This mechanism is especially applicable to the key mechanism of pianos, where a reverse motion is required and where two parallel motions are necessary, as in the above case.

I claim as my invention—

1. The combination of the lever having its fulcrum at F, one arm of said lever being pivoted to a quadrangular link-work, with long links pivoted to the link-work, as described, and to a base-pivot, substantially as set forth.

2. The combination of a two-armed lever fulcrumed at F to the base, one arm of said lever connected to a quadangular link-work, with long links connecting said link-work with a base-pivot L′, the other arm of the said lever being pivoted to an independent set of quadrangular link-work, said set being connected to a base-pivot $L^2$ by long links, substantially as and for the purpose set forth, and in the manner described.

3. The combination of the lever fulcrumed at F, two arms of said lever being at an angle to each other, with quadrangular link-work pivoted to each arm, with long links pivoted to the link-work and to a base, substantially as described.

4. The combination of the lever fulcrumed at F, the arms of which are at an angle to each other, each arm pivoted to a quadrangular link-work, one of which is continued, forming a second quadrangular set of links, pivoted in turn to one arm of a second lever, the opposite arm of which carries a set of quadrangular links, with long links connecting each set of quadrangular links with the base, in substantially the manner described, whereby the movement is reversed, substantially as set forth.

In testimony whereof I have signed my name to this specification in the presence of two subscribing witnesses.

JAMES P. H. GASTRELL.

Witnesses:

HENRY HOWSON,

JNO. E. PARKER.